No. 615,869. Patented Dec. 13, 1898.
W. Z. MARSH.
VEHICLE AXLE AND ADJUSTABLE SAND BAND.
(Application filed July 11, 1898.)
(No Model.)
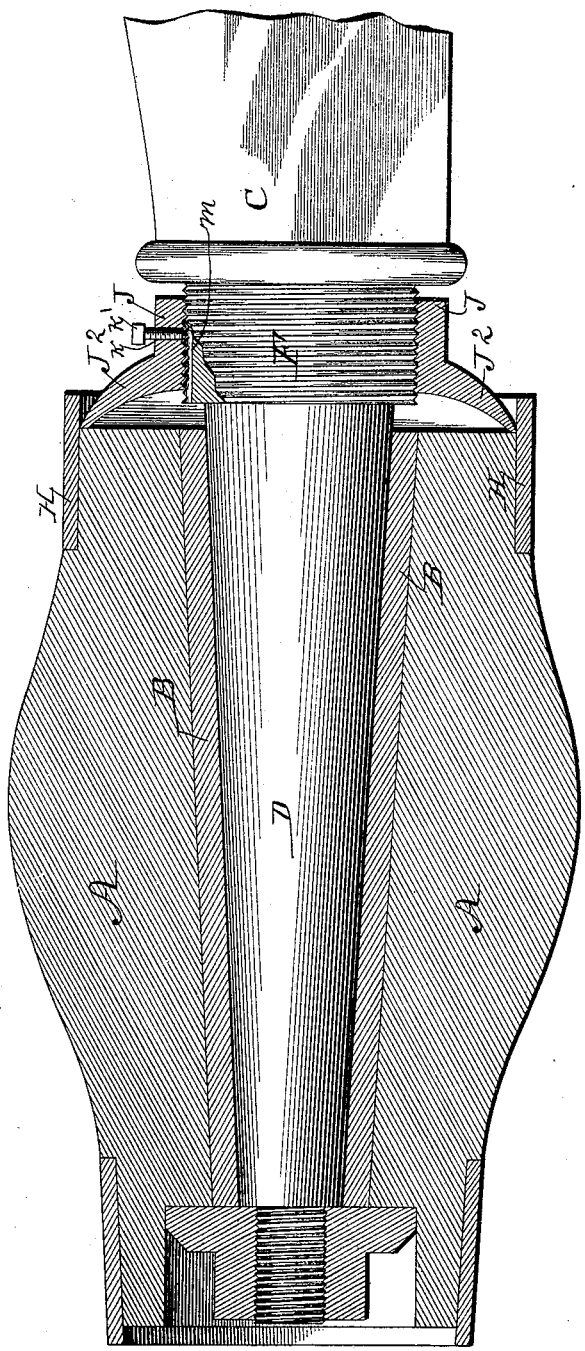
Witnesses:
Bruce Marsh
A. Vinet
Inventor:
William Z Marsh

UNITED STATES PATENT OFFICE.

WILLIAM Z. MARSH, OF BROOKS, IOWA, ASSIGNOR OF ONE-HALF TO JOHN THOMPSON, OF SAME PLACE.

VEHICLE-AXLE AND ADJUSTABLE SAND-BAND.

SPECIFICATION forming part of Letters Patent No. 615,869, dated December 13, 1898.

Application filed July 11, 1898. Serial No. 685,718. (No model.)

*To all whom it may concern:*

Be it known that I, WILLIAM Z. MARSH, a citizen of the United States, residing at Brooks, in the county of Adams and State of Iowa, have invented a new and useful Vehicle-Axle and Adjustable Sand-Band, of which the following is a specification.

My object is to combine sand-bands with the axles and hubs of traction-wheels of carriages in such a manner as to produce reservoirs for oil, to thereby facilitate lubricating the axles and excluding sand and other extraneous matter from the axles and boxings in the hubs.

My invention consists in the construction, arrangement, and combination of parts, as hereinafter set forth, pointed out in my claim, and illustrated in the accompanying drawing, in which—

The letter A designates a wooden hub, and B a metal boxing fixed in a central longitudinal bore in the hub.

C is an axle, and D a spindle fitted in the boxing B.

F is a screw integral with the rear and large end of the spindle D and of larger diameter than the spindle.

H is a metal band fixed on the rear end of the hub A and projects beyond the wood, as shown in the drawing.

J is a metal collar with screw fitted on the screw F and is adjustable thereon and has an integral curved flange $J^2$ fitted in the metal hub-band H to contact with the rear end of the hub in such a manner as to produce an annular chamber around the rear end of the spindle D, adapted to retain oil for lubricating the spindle and also to serve as a sand-band to protect the spindle from sand or other foreign gritty and obstructive matter. This flange and sand-band $J^2$ is concavo-convex in form and thin at its circumference, and the face of its circumferential edge is flat where it engages the hub and consequently prevents oil from escaping, while at the same time there is very little friction between the sand-band and the hub.

$k$ is a screw-seat and vent in the metal screw J, and $k'$ is a screw fitted therein for closing the vent and fastening the collar J and band $J^2$ to the screw F.

$m$ is a groove in the screw F, intersecting the vent $k$ in such a manner that oil can flow through the vent and groove into the annular chamber at the inner end of the screw J as required to store a supply of oil in the chamber to lubricate the spindle D in the box B within the hub A.

It is obvious that the collar J and the integral flange and sand-band $J^2$ can be readily adjusted on the screw F relative to the hub A as required to maintain an air-tight oil-chamber and also as required to compensate for any wear that may occur on the end of the hub or the edge of the sand-band contacting therewith, so that packing and washers will never be required. It is also obvious that as long as a supply of oil is retained in the oil-chamber the spindle and boxing will be lubricated by a continuous flow of oil in minute quantity toward the small end of the spindle and the nut thereon that retains the hub and wheel on the spindle as required for practical use.

I am aware that a cap and a collar have been combined with an axle and a metal boxing of peculiar form to produce an annular chamber to retain lubricant; but in no instance has a sand-band consisting of a collar having an integral annular flange been adjustably connected with an axle having an external screw in such a manner that the circumference of the sand-band would engage the end of a wooden hub to produce a reservoir for oil and also to prevent extraneous matter from entering between the end of the hub and the edge of the sand-band, as contemplated by my invention.

Having thus described the construction, arrangement, combination, operation, and utility of my invention, what I claim as new, and desire to secure by Letters Patent therefor, is—

An axle having a spindle and an integral screw at the rear end of the spindle and a groove in the said screw for conveying oil, a sand-band having an internal screw fitted on said screw on the rear end of the spindle and also having an annular flange to engage the end of a wooden hub and provided with a vent to intersect the groove in the screw integral with the rear end of the spindle, in combination with the hub of a wheel, for the purposes stated.

WILLIAM Z. MARSH.

Witnesses:
F. E. RICHEY,
BRUCE MARSH.